United States Patent [19]

Reusser

[11] 4,384,737

[45] May 24, 1983

[54] THREADED JOINT FOR WELL CASING AND TUBING

[75] Inventor: Hans E. Reusser, Westlake, Ohio

[73] Assignee: Republic Steel Corporation, Cleveland, Ohio

[21] Appl. No.: 143,542

[22] Filed: Apr. 25, 1980

[51] Int. Cl.³ .............................................. F16L 25/00
[52] U.S. Cl. .................................... 285/334; 285/351; 285/369; 285/383
[58] Field of Search ............... 285/333, 382, 334, 355, 285/369, 340, 383, DIG. 18, 334.4, 334.2, 351; 403/343; 277/236; 411/414, 423, 436

[56] References Cited

U.S. PATENT DOCUMENTS

| | | | |
|---|---|---|---|
| 2,893,759 | 7/1959 | Blose | 285/334 |
| 3,109,672 | 11/1963 | Fronz | 285/334 |
| 3,224,799 | 12/1965 | Blose et al. | 285/334 |
| 3,447,820 | 6/1969 | Durman | 285/382 X |
| 3,572,777 | 3/1971 | Blose | 285/334 |
| 3,870,351 | 3/1975 | Matsuki | 285/334 |
| 4,124,232 | 11/1978 | Ahlstone | 285/381 |
| 4,153,283 | 5/1979 | Hellmund | 285/334 |

FOREIGN PATENT DOCUMENTS

1596005  7/1970  France .................. 285/DIG. 16

*Primary Examiner*—Dave W. Arola
*Attorney, Agent, or Firm*—Watts, Hoffmann, Fisher & Heinke

[57] ABSTRACT

A threaded joint for well casings and tubings includes a coupling or integral socket into which pipe sections are threaded. The coupling or socket includes an inner, unthreaded portion and an outer portion having threads on its inner surface. The pipe sections include an end having a threaded portion and an unthreaded nose portion at the outer end of the threaded portion. The nose portion terminates with an annular surface and includes a plurality of convex surfaces of revolution extending circumferentially of the nose portion, all of which surfaces are adapted to engage the unthreaded portion of the coupling or socket to establish a fluid-tight seal. The thread construction is a modified buttress type with relatively flat crests and roots. An interference fit occurs between thread portions not likely to be damaged during handling, and clearance between other thread portions permits the joint connection to be made with reduced friction and with reduced concern for machining tolerances. To increase effective wall thickness and overall strength of the joint, the threads are truncated to vanishing points. Hoop stresses are made low and relatively uniform throughout the entire range of tubing and casing diameters.

15 Claims, 5 Drawing Figures

THREADED JOINT FOR WELL CASING AND TUBING

BACKGROUND OF THE INVENTION

The invention relates to threaded joints for well casing and tubing and, more particularly, to a threaded joint in which joint strength, sealing capabilities, ease of assembly, and resistance to stress corrosion, among other things, are enhanced over prior threaded joints.

Oil and natural gas wells currently are being driven to depths in excess of 5,000 feet. In the drilling of such wells, sections of tubing connected by threaded couplings and having a drill bit at the lower end progressively are advanced into the earth. After the well has been drilled to its final desired depth, or at some point during the course of the drilling operation, a casing having a diameter greater than the diameter of the tubing is driven into the earth. The casing surrounds the tubing and prevents the sidewalls of the hole from collapsing. Generally the casing does not extend very far into the earth, usually only far enough to ensure that the sidewalls of the hole are sufficiently strong that the walls will not collapse. In the description to follow, the term "pipe section" will be used to refer generally to tubing or casing sections, or both, as the case may be.

It will be understood that in a string of tubing, which may extend to a depth approaching 5,000 feet, the uppermost tube joint must withstand the total weight of the tubing, even though no external forces are exerted and the tubing simply is suspended. Since the ordinary tubing used today weighs from 8 to 60 pounds per foot of tubing length, a tremendous load must be carried by the joint threads. If the tubing also is used for the purpose of drilling the well (as opposed to merely conducting fluid from the well), the joint must be able to withstand high torque loads in addition to the tensile load.

Another consideration is that a well rarely is driven exactly in a straight line from the surface of the earth to the bottom of the well. Obstructions almost certainly will be encountered during the drilling operation, and slight deviations from the intended drilling path will occur. The tubing used to drill the well and/or convey fluid from the well must be able to follow the course of the well as greater depths are reached. This places bending loads on the tubing at various places along its length and produces higher stress than would be encountered if the well were drilled in exactly a straight line.

Because the well deviates from a straight line and because the tubing may be urged downwardly during the drilling operation, the tubing actually may be under compression for periods of time. This is particularly so with casing sections because they often are driven into the well. Although the threaded joints must be able to withstand tremendous tensile loads, the joints must be able to absorb considerable compression loads also. Threaded joints have been known to "ratchet" under extreme compression; that is, the threads may be forced past each other without the pipe sections being rotated relative to the coupling. Ratcheting can lead to catastrophic failure of the joint, and even if complete failure does not occur, the threads may be deformed sufficiently that fluid leakage is likely.

Other considerations must be taken into account in designing a threaded joint having acceptable characteristics. For example, it is important that the joint provide a seal against leakage between mating threaded elements. This may be achieved by providing, upon makeup of the joint, a metal-to-metal seal between interfitting or interengaging faces of male and female threaded elements of the joint. It is important that the mating portions be generally free of defects or blemishes because, unless substantial surface-to-surface contact is maintained, leakage likely will occur. This is particularly so in the case of a very deep well due to the extreme fluid pressures involved and because the considerable jostling which the tubing undergoes tends to loosen the threaded connections and thereby lead to a leakage condition.

Problems occur in assembling the joints in that the components to be assembled are so heavy and unwieldy that it is difficult to handle them without damage, particularly as a new pipe section is being "stabbed" into a coupling. The result of this is that the threads easily can be blemished or the joints can be threaded improperly, which if carried far enough, can result in destruction of the threaded connection and require that new coupling and pipe sections be substituted. In short, it not only is desirable that the components be capable of being assembled quickly, but also that they can sustain damage from handling and stabbing.

A part of the difficulty in this area arises from the techniques employed to assemble the joint components. Because the pipe sections are so heavy and unwieldy, machinery must be employed to assist in assembling the components at the job site. This machinery not only lifts the new section to be added to the already-connected sections, but the machinery also rotates the new section to secure the threaded connection. A common difficulty has been that of accurately controlling the torque applied to the pipe section so that portions of the joint are not overstressed. Accordingly, it is desirable that a positive stop be provided so that when a predetermined level of thread engagement has been reached, rotation of the pipe section will be stopped abruptly. Although this capability has existed for some time, the various prior threaded joints have not been designed to account for different stress levels reached during the tightening process. That is, the coupling process produces hoop stresses in the connected components and it has been found that existing joint designs produce higher hoop stresses in smaller diameters with equal power-tightening travel applied to a range of sizes. This obviously increases the risk of premature failure unless service ratings are reduced along with size. One approach to this problem has been to make the smaller-diameter couplings proportionately bulkier simply to withstand the higher anticipated hoop stresses.

Reduction of hoop stress is important, not only to optimize the service pressure rating of the joint and to reduce the size of the joint components, but also to reduce stress corrosion in acidic wells. Although the patentee does not wish to be bound by a particular theory, it is generally known that tubing components corrode faster with increasing stress levels when maintained in contact with acidic compositions.

SUMMARY OF THE INVENTION

The foregoing and other problems in prior threaded joints for well casings and tubings are overcome by the new and improved threaded joint according to the invention, which is exceedingly strong, easy to assemble, highly resistant to stress corrosion and leakage caused by blemishes, and that surpasses the performace of standard buttress thread joints at only a modest cost increase.

The joint of this invention includes a pipe section at least one end of which forms a male member having a threaded portion near the end and terminating in an unthreaded nose portion. The nose portion includes a transverse annular surface at its end, followed by a plurality of axially spaced ridges having convex surfaces of revolution disposed in tangent to stepped cylindrical surfaces so as to uniformly contact a mating socket taper. An absence of inward recessing from the ridge step diameters allows for machining these with an axial direction of tool feed. The joint also includes a female member, such as a coupling (or alternatively an integral socked formed at one end of a pipe section by an expansion of the pipe wall), having a central or inner, unthreaded, portion defining regions adapted to engage the annular ridges to establish a fluid-tight seal with the nose portion of the pipe section. The seal-defining regions of the female member include an annular surface engageable with the annular surface at the end of the nose portion in surface-to-surface contact, (except with the alternative integral socket formation), as well as another annular surface engageable tangentially with the convex surfaces of revolution forming the ridges. In essence, this construction of a coupling provides a redundant metal-to-metal fluid-tight seal such that small blemishes at the ends of the pipe section are not likely to completely disrupt the sealing engagement between the female member and unblemished portions of the pipe section nose. The sealing effect is enhanced by a slight elastic deformation of the mating surfaces.

The innermost diameter or central bore of the coupling member is identical to the maximum pipe bore that will be used. Smaller bores on heavier-walled pipes are internally end-chamfered to match. The chamfer taper is gradual enough to ease the passage of pipe joint and tool projections and to minimize flow turbulence and abrasive erosion at the pipe ends. The internal coupling shoulder not only improves joint assembly, sealing and through-flow, it reinforces the joint against pressure and bending stresses with no added external bulk. If the alternative integral socket form is made by expanding one pipe end, the absence of extra wall material for forming an internal stop shoulder necessarily imposes some functional limitations.

An important aspect of the invention is the thread construction of the mating parts, i.e., the pipe sections and couplings or sockets. The threads have been designed so that not only is optimum performance achieved for a given-sized pipe section, but joint hoop stresses are uniformly low throughout the entire range of tubing and casing diameters. The hoop stresses are reduced and made more uniform by positive seating, combined with a different tightening allowance for each joint diameter. In previous practice, joints of different diameter would have the same power-tightening travel, resulting in hoop stresses that vary greatly in inverse proportion to the diameter. Those stress levels at the high end are moderated with the present joint construction by providing a different allowance for tightening to an internal stop for different diameters. The differences are graduated to reduce the hoop stress range by at least half from previous practice over a casing diameter range of 4½ to 13⅜ inches and a tubing diameter range of 2 to 4½ inches. This reduction in tightening stress, more pronounced for decreasing sizes, allows significant increases in permissible internal and external operating pressures over existing ratings.

The thread construction also facilitates stabbing and fast make-up of the joint connection. These advantages are brought about by a thread form in which the pitch of the threads is increased as the diameter of the joint increases. In the larger tubing and casing sizes, some double threads per lead are used. In effect, the helix angle of the threads is increased in the large diameter sizes to prevent damage by lessening the mechanical advantage in the tightening process.

As used herein, the term "male threads" refers to threads on the pipe sections to be connected and the term "female threads" refers to threads on the receiving member, such as on the inner surface of a coupling. Each male thread generally is of the buttress type and includes relatively flat crests and roots, adjacent ones of which are connected by leading flanks and trailing flanks as measured in the direction of pipe connection. Stated differently, the leading flanks are on the side of the threads toward the adjacent end of the pipe section and the trailing flanks are on the side of the threads toward the center of the pipe section. The female threads are constructed similarly, and also include crests, roots, and leading and trailing flanks arranged in a corresponding order as their counterparts on the male threads.

To withstand extreme tension and reduce stress concentrations, the threads are quite wide near their roots. This is achieved in the female threads by making the trailing flank radius at the root equal to the trailing flank radius at the crest; in the male threads, the leading flank radius at the root is slightly larger than the leading flank radius at the crest.

To prevent thread ratcheting under severe column compression, the leading flank angle of the male threads and the trailing flank angle of the female threads are limited to about 15° from the perpendicular to the pipe axis, away from the direction of pipe connection. Ratcheting also is prevented by the nose seating described earlier.

In order to reduce taper seizure in stabbing, the male roots and the female crests are parallel to the longitudinal axis of the pipe section. In order to help provide guidance and minimize jolting during the assembly procedure, the male crests and the female roots are parallel to the pitch line taper.

An interference fit is provided between the male roots and the female crests and between the male trailing flanks and the female leading flanks in the fully tightened position. Clearance is provided for the remaining portions of the threads. Essentially, only two out of four potential contact surfaces of each thread actually are engaged by portions of the other thread. The clearances at male thread leading flanks and crests apply equally to root-truncated partial threads as hereinafter described. This construction results in several advantages: (a) full-length root-to-crest thread contact provides increased column bending resistance; (b) less critical thread finishing is required; (c) contact between the male and female threads is in areas that are least vulnerable to damage from handling; and (d) makeup torque is reduced because frictional interference between threads is delayed until a final tightening effort is approached.

Toward the nose of the pipe section and the interior end of the coupling or socket, the threads are truncated to a vanishing point defined by cylindrical extension of the smallest-diameter full-thread male root and female crest. Toward the center of the pipe section and each outer end of the coupling or socket, the male threads are truncated to a vanishing point defined by the outer periphery of the pipe section while the female threads are truncated to almost a vanishing point defined by a slightly larger diameter than the outside of the pipe section (i.e., to a clearance diameter). Because the coupling or sockets threads are truncated, the coupling or socket walls are not weakened with unused thread grooving. In short, female thread truncation leaves more coupling or socket wall intact for increases in strength and rigidity; increased service ratings are made possible with little or no enlargement over existing coupling or socket diameters. Furthermore, the tight confinement of a thread sealing compound, within thread clearance spaces that are minimized at the truncated male crests, greatly improves resistance to joint penetration and corrosion under external pressure.

Additional advantageous features of the invention will become apparent from the following detailed description of a preferred embodiment of the invention made with reference to the accompanying drawings which form a part of the specification.

DESCRIPTION OF THE PREFERRED EMBODIMENT

Figure 1:
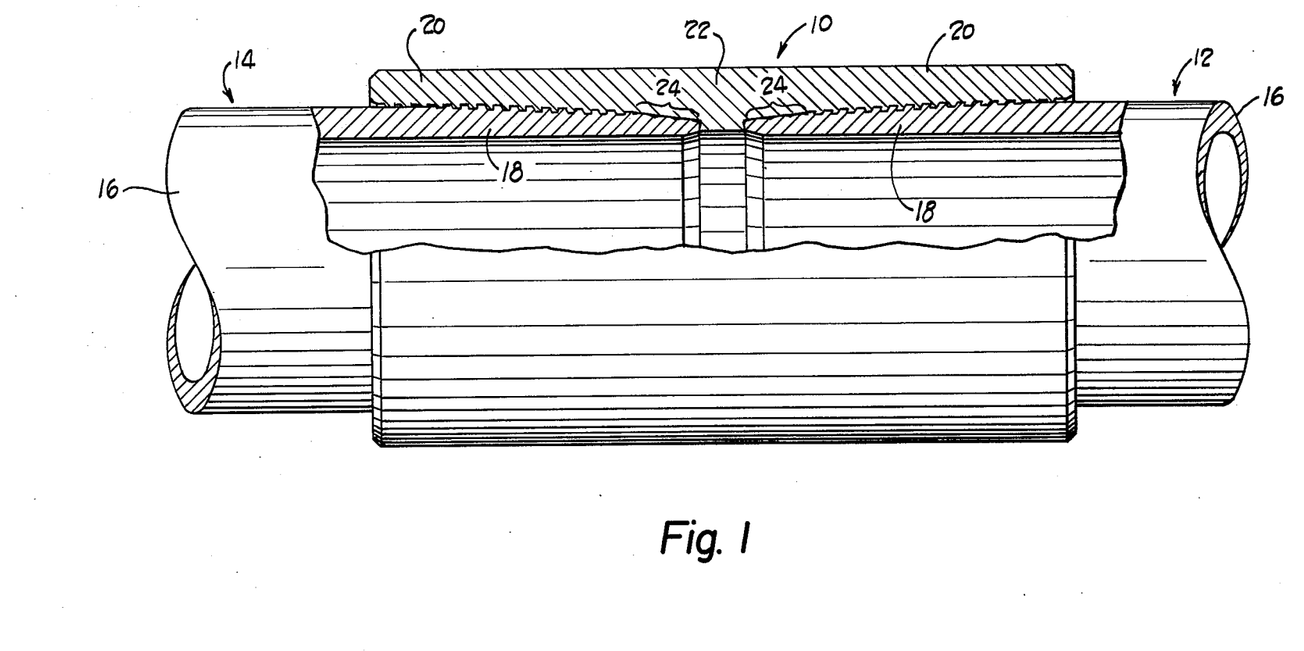
FIG. 1 is a side elevational view, partly in section, of a threaded joint embodying the invention.

A threaded join embodying the present invention and useful for connecting well tubing, well casing, and the like, is shown in FIG. 1. The threaded joint includes a coupling 10 for joining the threaded ends of two pipe sections 12, 14, which, as shown, are the type used for well tubing or casing. The pipe sections 12, 14 are substantially identical and further description generally will deal only with half of the coupling and one end of the pipe section 12, with the understanding that the description is applicable to the remaining portion of the coupling and the other pipe section 14, which are in mirror relationship.

The pipe section 12 is a tubular member having an elongate, central portion 16 and tapered, threaded end portions 18 (only one of which is shown for the pipe section 12). For oil well tubing, most pipe sections range in outside diameter from about 2 to about 4.5 inches, calling for a minimum wall thickness range from about 0.165 to 0.270 inch. For oil well casing, most pipe sections range in outside diameter from about 4.5 to 13.4 inch, calling for a minimum wall thickness range (i.e., at the nose portion) from about 0.225 to 0.380 inch, for coupling flushness in the largest bores.

The coupling 10 for the above described pipe applications ranges in length from about 8.1 to 9.2 inches for tubing and from about 9.3 to 11.4 inches for casing. It is important for both tubing and casing applications to minimize the enlargement by coupling 10 over the outside diameter of the connected pipes without compromising performance. The increases from pipe to coupling outside diameters range from about 0.30 to 0.42 inch with tubing and from about 0.38 to 0.63 inch with casing.

Figure 2:
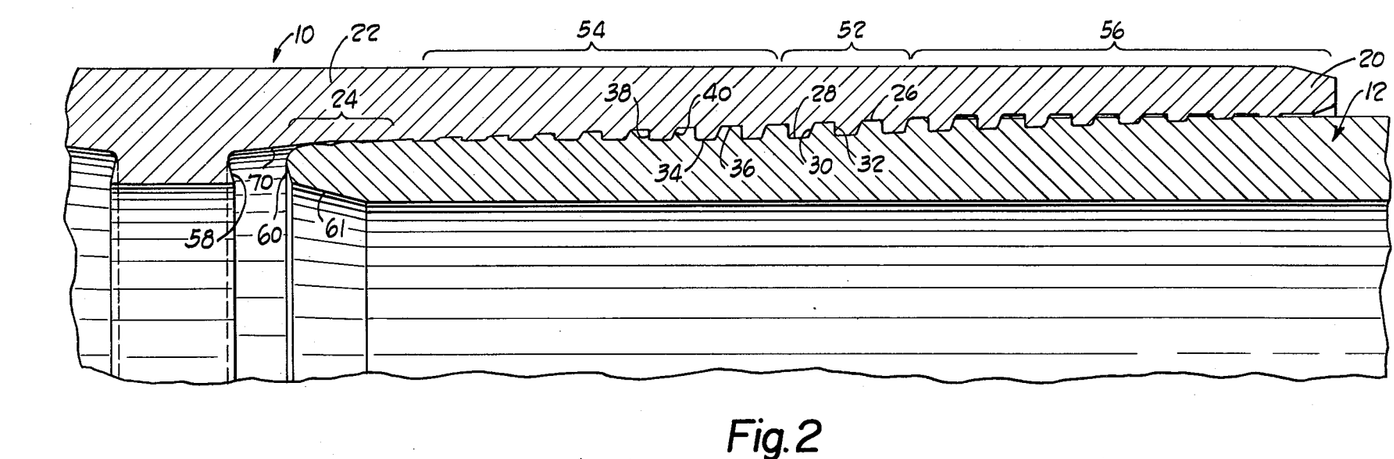
FIG. 2 is an enlarged sectional view of a portion of the threaded joint of FIG. 1, showing the coupling and a pipe section in hand-tight position.
Figure 3:
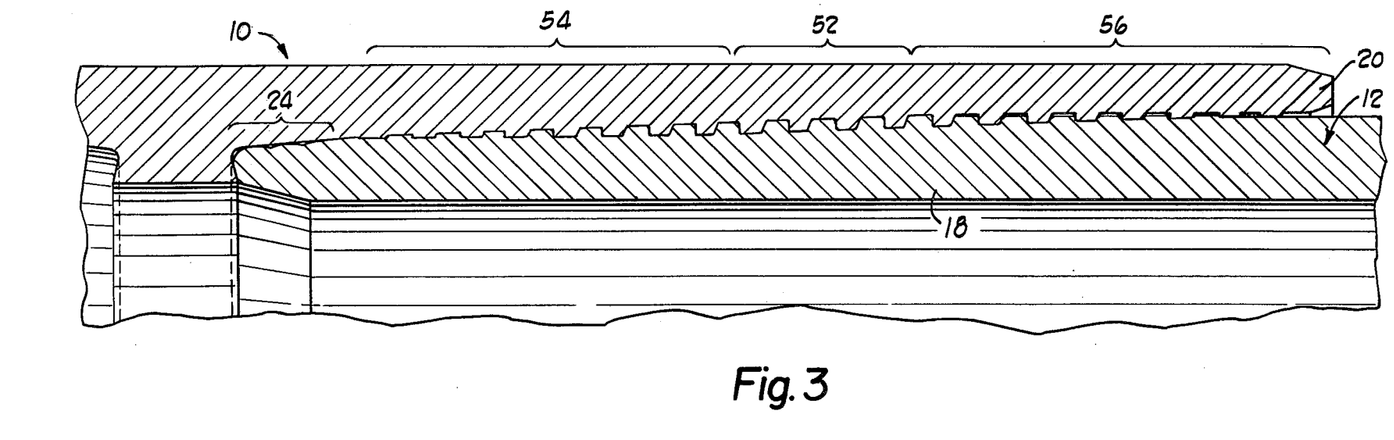
FIG. 3 is a view similar to FIG. 2, showing the coupling and the pipe section fully tightened.

Referring more particularly to FIGS. 2 and 3, the coupling includes a threaded end or outer portion 20 adapted to engage the threaded end portion 18 of the pipe section 12, and a central, unthreaded portion 22 adapted to engage the unthreaded end, or nose portion 24, of the pipe section 12 in a fluid-tight relationship. As used in the patent, the term "male threads" refers to threads on the outer surface of one end portion 18 of the pipe section 12 and the term "female threads" refers to threads on the inner surface of the outer portion 20 of the coupling 10. Each male thread generally is of the buttress type and includes relatively flat crests 26 and flat roots 28, adjacent ones of which are connected by leading flanks 30 and trailing flanks 32, considered in the direction of pipe connection. State differently, the leading flanks 30 are on the side of the threads toward the end of the pipe section 12 and the trailing flanks 32 are on the side of the threads toward the central portion 16 of the pipe section 12. The female threads are constructed similarly and include crests 34, roots 36, and leading and trailing flanks 38, 40, arranged in the same order as are their counterparts on the male threads. These elements and their relationship to each other will be understood more readily by referring to FIG. 4, where greatly enlarged threads according to the invention are shown.

Figure 4:
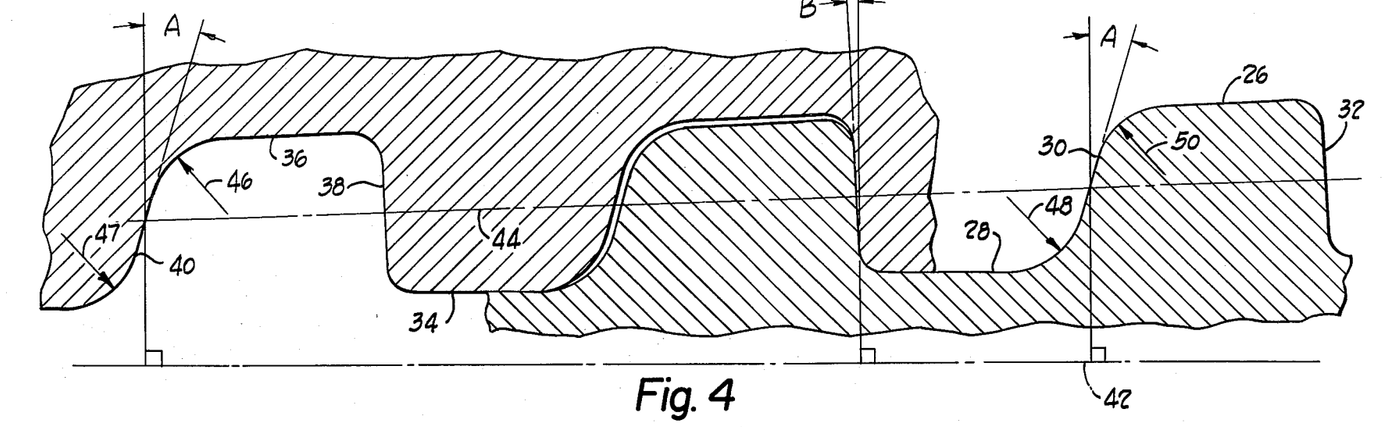
FIG. 4 is an enlarged sectional view of a portion of the threads of the point of FIG. 1.

The connected pipe sections 12, 14 and coupling 10 define a longitudinal axis extending centrally of the connected members. This axis is represented in FIG. 4 by the line 42. The male and female threads are tapered from a larger diameter to a smaller diameter in the direction of pipe connection. This taper is shown by the pitch line 44 in FIG. 4, which converges toward the axis line 42 in the direction of pipe coupling. In a preferred embodiment of a casing, the pitch line 44 is at an angle of approximately 2.4° with the axis for a thread taper of approximately 1 inch on the diameter per foot of length; and in a preferred embodiment of tubing, the pitch line 44 is at an angle of approximately 1.8° with the axis for a thread taper of approximately ¾ inch on the diameter per foot of length.

The male leading flanks 30 and the female trailing flanks 40 are inclined at an angle A measured clockwise in FIG. 4 from a perpendicular to the axis 42. In the embodiment illustrated, angle A is on the order of 15 degrees. This moderate inclination of the male leading flanks 30 and the female trailing flanks 40 helps to prevent thread ratcheting under severe compression. The male trailing flanks 32 and the female leading flanks 38 are inclined at an angle B when measured counterclockwise in FIG. 4 from a perpendicular to the axis 42. In the embodiment illustrated, angle B is on the order of 3 degrees. In order to reduce tape seizure in stabbing, the male roots 28 and the female crests 34 are parallel to the axis 42. To minimize jolting during the assembly procedure, the male crests 26 and the female roots 36 are parallel to the pitch line 44.

In order to withstand extreme tension and reduce stress concentration, the threads are quite wide near their roots. The width of the threads is controlled, in part, by the following parameters. In the female threads, the trailing flank radius at the root, as indicated in FIG. 4 by the arrow 46, is equal to the trailing flank radius 47 at the crest. In the male threads, the leading flank radius at the root, as indicated in FIG. 4 by the arrow 48, is slightly larger than the leading flank radius 50 at the crest. In the casing embodiment, the radii 46, 47 are on the order of 0.033 inch and in the tubing embodiment the radii 46, 47 are on the order of 0.021 inch. The radius 48 is equal to the radius 47, while the radius 50 in the casing embodiment is approximately 0.030 inch and in the tubing embodiment is approximately 0.019 inch. Proportionately, the radii 46, 47 and 48 are sized about 50% of the full male thread depth at the shallower trailing flank 32.

Referring particularly to FIGS. 2 and 3, both the male and female threads are divided generally into three regions: (a) a central "perfect" region 52 where the threads are of the full dimensions set forth above; (b) a first "imperfect" region 54 located toward the end of the pipe section 12 and the center of the coupling 10 where the threads are truncated to a vanishing point; and (c) a second imperfect region 56 located toward the central portion 16 of the pipe section 12 and the outer end of the coupling 10 where the threads similarly are truncated. For a range of outside diameters from 4½ inches to 13⅜ inches, the region 52 of a preferred embodiment will have an axial extent ranging between about 0.5 to 1.3 inches, while the regions 54, 56 will each have an axial extent of about 1.65 inches in the casing embodiment and 1.36 inches in the tubing embodiment.

In the region 54, the thread truncation is accomplished by cylindrical extension of the smallest full-thread minor diameter (i.e., the smallest-diameter full-thread male root and female crest). In the region 56, the truncation is accomplished by cylindrical extension of the largest-diameter full-thread male crest; the female roots in this region are truncated by cylindrical extension of the largest-diameter full-thread female root on a slightly larger diameter (i.e., a clearance diameter), to almost a complete vanishing point. Because the coupling threads are truncated, the coupling walls are not weakened with unused thread grooving. Alternatively stated, coupling thread truncation leaves more coupling wall intact for increased strength and rigidity. Increased service ratings are made possible with little or no enlargement over existing coupling diameters.

Partly to reduce hoop stresses and partly to permit quick assembly, the thread pitch is increased in the larger diameter joints. For example, casing sections will have five threads per inch, while tubing sections, which are smaller diameter, will have eight threads per inch. Also, double thread leads are used in the larger diameter sizes to eliminate excessive makeup turns. In casing sections of a preferred embodiment having outside diameters over about 8.5 inches, with a double thread lead, each turn advances the section about 0.4 inch. In tubing sections of a preferred embodiment having outside diameters over about 3.5 inches, with a double thread lead, each turn advances the section about 0.25 inch.

An interference fit is provided between the male roots 28 and the female crests 34 and between the male trailing flanks 32 and the female leading flanks 38 in the fully tightened position. Clearance is provided for the remaining portions of the threads. Essentially, only two out of four potential contact surfaces of each thread actually are engaged by portions of the other thread. The interference fit is minimized in the region 54 of cylindrically truncated thread bearing and is not subject to increasing thread taper tightening interference. Such increasing interference occurs in the tapered thread bearing regions 52 and 56 accompanied by taper socket 70 engagement with the sealing nose 24. This construction provides a full-length thread-to-thread contact in all three thread regions 52, 54, 56 for increased bending resistance. Because only two out of four potential contact surfaces of each thread actually are engaged, less critical machining tolerances are required. On the other hand, the thread contact which does not occur is in areas that are least vulnerable to damage from handling. An additional advantage of the particular thread contact described is that the work required to assemble the joint is reduced because frictional interference between threads is delayed until a final tightened condition is approached.

The central, unthreaded portion 22 of the coupling 10 includes regions to establish a fluid-tight seal with the nose portion 24 of the pipe section 12. See FIG. 5. One of these regions is defined by a conically projecting surface 58 inclined at an angle C from a plane perpendicular to the axis 44. In many applications, the angle C will be on the order of 10–15 degrees and, in the threaded joint illustrated, the angle C has been selected to be 12 degrees. The unthreaded nose portion 24 of the pipe section 12 includes a conically recessed surface 60 inclined at the angle C from a plane perpendicular to the axis 44. The annular surfaces 58, 60 establish surface-to-surface contact upon pipe-coupling makeup. A chamfer taper 61 on the pipe end reduces the internal pipe diameter to that of the innermost diameter 59 of the coupling shoulder to ease the passage of pipe joint and tool projections and to minimize flow turbulence and abrasive erosion at the pipe ends. The internal coupling shoulder not only improves joint assembly, sealing and through-flow, it reinforces the joint against pressure and bending stresses with no added external bulk.

Figure 5:
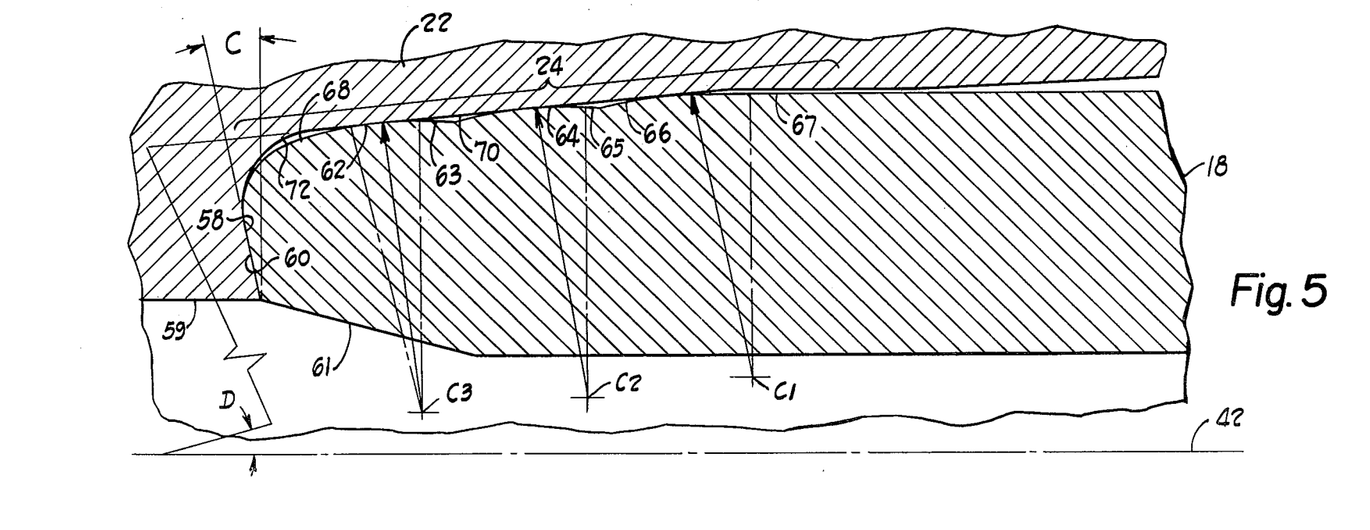
FIG. 5 is an enlarged sectional view of an internal, unthreaded portion of the coupling and a nose portion of a pipe section, fully tightened.

The foregoing construction achieves several beneficial results. It provides a positive stop so that when the pipe-coupling makeup is performed in the field by machinery, the tightening torque will rise abruptly at the end of the tightening process, thereby indicating to the assemblers that a completed connection has been made. Further, the nose portion 24 of the pipe section 12 tends to be contracted circumferentially during the tightening process and the engagement of the surfaces 58, 60, together with their direction of incline, stops further potentially harmful contraction of the nose portion 24. The contact between the surfaces 58, 60 also partially imparts the sealing characteristics of the joint.

Another region that establishes a fluid-tight seal between the nose portion 24 and the central portion 22 includes a plurality of convex surfaces of revolution 62, 64, 66 (FIG. 5) extending circumferentially of the unthreaded nose portion 24. An intermediate convex surface of revolution 68 connects the radially outer end of the conical recess 60 and a tapered extension of the convex surface of revolution 62. The convex surfaces of revolution 62, 64, 66 form an inclined series of ridges longitudinally of the nose portion, each ridge having an arcuate contour in the longitudinal direction of seal engagement, and a cylindrical tangent portion in the opposite or transverse direction, as illustrated in the sectional view of FIG. 5. The centers C1, C2, C3 of the arcuate contours are equally spaced axially of the pipe section 12 and each is closer to the axis 42 than the next, considered in the direction of pipe connection. Thus, although it is expected that the radii of the surfaces of revolution 62, 64, 66, when viewed in longitudinal-section, will be the same, for example, about 0.25 inch in the embodiment shown, the arcuate surfaces join with tangent cylindrical surface portions 63, 65, 67 at differing diameters. As a result, only arcuate ridges will uniformly contact the mating taper surface 70, but all portions of the nose end 24 may be machined by tools fed in an axial direction. The radial location of the surfaces 62, 64, 66 has been selected so a common tangent to the surfaces is inclined at an angle D from the axis 44. In the embodiment illustrated, angle D has been selected to be six degrees and should be at least twice the thread taper.

The central portion 22 of the coupling 10 includes on each side a tapered socket surface 70 engageable with the convex surfaces of revolution 62, 64, 66. An intermediate, concave surface of revolution 72 connects the radially outer end of the conical surface 58 and the radially inner end of the tapered surface 70. Surfaces 68, 72 do not engage upon pipe-coupling makeup. The tapered surface 70 is inclined at the angle D to the axis 42 to establish a tangential relationship with all of the convex surfaces of revolution 62, 64, 66 upon pipe-coupling makeup.

In order to overcome as much as possible the effect of small blemishes on the nose section which might occur while the pipe section is being handled during stabbing or otherwise, the convex surfaces of revolution 62, 64, 66 are deformed elastically to a certain extent upon pipe-coupling makeup. This elastic deformation improves the fluid seal and provides a seal even if small blemishes exist on the nose portion of the pipe section. Because angle D is large with respect to that of the taper of the pitch line 44 (i.e., more than twice as great), sealing engagement between the convex surfaces of revolution 62, 64, 66 and the surface 70 is delayed until the final tightening occurs. This delayed contact is known as a "fast engagement" and provides superior sealing characteristics. The positive-stop feature resulting from the rather abrupt engagement of the surfaces 58, 60 acts to limit sealing deformation and prevent the contacting metal at surfaces 62, 64, 66, 70 from being stressed beyond the elastic limit. As a consequence, the joint can be assembled and disassembled repeatedly without permanent deformation of the sealing regions.

Reduction in hoop stress in smaller diameter joints relative to larger during tightening is achieved by reducing the power-tight travel required as the joint diameter decreases. The power-tight travel is represented by the gap between the pipe nose surface 60 and the coupling stop surface 58 at the hand-tight position illustrated in FIG. 2. The variation for different pipe diameters of a preferred embodiment is shown by the following table:

TABLE

| OUTSIDE PIPE DIA. (nominal inches) | POWER-TIGHT TRAVEL (inches) |
|---|---|
| CASING | |
| 4½ | .233 |
| 5 | .236 |
| 5½ | .242 |
| 6⅝ | .253 |
| 7 | .256 |
| 7⅝ | .262 |
| 8⅝ | .275 |
| 9⅝ | .283 |
| 10¾ | .294 |
| 11¾ | .303 |
| 13⅜ | .320 |

TABLE-continued

| OUTSIDE PIPE DIA. (nominal inches) | POWER-TIGHT TRAVEL (inches) |
|---|---|
| TUBING | |
| 2 | .188 |
| 2⅜ | .196 |
| 2⅞ | .206 |
| 3½ | .218 |
| 4 | .228 |
| 4½ | .238 |

Although the invention has been described with a certain degree of particularity, it will be appreciated that the present disclosure of the preferred embodiments has been made only by way of example. Various changes in the details of construction may be resorted to without departing from the true spirit and scope of the invention and it is intended to cover such changes in the appended claims.

I claim:

1. A joint for well casing, well tubing, and the like, comprising:
   (a) a threaded pipe section having a central longitudinal axis and an unthreaded end portion, the unthreaded portion including:
      (i) a first, transverse, annular surface formed at a nose of the unthreaded portion; and
      (ii) a plurality of longitudinally adjacent convex surfaces of revolution extending circumferentially of the unthreaded end portion, each having a longitudinal curvature and each of a mean diameter less than the next considered in the direction toward the nose; and
   (b) a threaded coupling for threadedly receiving said pipe section and having an internal, unthreaded, portion providing regions to establish a fluid-tight seal with the end portion of the pipe section, comprising:
      (i) a second, transverse, annular surface engageable with the first annular surface, the second annular surface oriented to establish surface-to-surface contact with the first annular surface upon pipe-coupling makeup; and
      (ii) a third annular surface engageable with the surfaces of revolution, the third annular surface being tapered to establish a tangential relationship with the surfaces of revolution upon pipe-coupling makeup.

2. The joint of claim 1, wherein:
   a portion of the first transverse annular surface forms an acute angle with a forwardmost of the convex surfaces of revolution and a portion of the second transverse annular surface is parallel thereto.

3. The joint of claim 1 or 2, further comprising:
   (a) an intermediate convex surface of revolution connecting a radially outer periphery of the first annular surface and a forwardmost of the convex surfaces of revolution; and
   (b) a concave surface of revolution connecting a radially outer periphery of the second annular surface and a radially inner periphery of the third annular surface, the concave surface of revolution and the intermediate convex surface of revolution being spaced upon pipe-coupling makeup.

4. A threaded joint for well casing, well tubing, and the like wherein male and female threaded members establish the connection, each of the threads having a root, crest, and leading and trailing flanks, comprising:

(a) surface-to-surface thread contact along a major portion of the male root and trailing flank and clearance along a major portion of the female root and trailing flank;

(b) the thread on the male member vanishing at the inner and outer end of the joint;

(c) the thread on the female member vanishing at the inner end of the joint and being truncated at the outer end of the joint;

(d) the male leading flank and the female trailing flank being moderately inclined, on the order of about 15° from a perpendicular to a longitudinal axis of the joint, in a direction to provide a taper to said flanks;

(e) the male root and female crest being parallel to the longitudinal axis of the joint; and (f) the male crest and female root being parallel to the pitch line of the threads and the pitch line being inclined relative to the longitudinal axis.

5. A threaded joint as set forth in claim 4 wherein the leading and trailing flank respectively of the male and female threads extend at an angle no greater than approximately 15° outward with respect to the inner end of the joint from a perpendicular to the longitudinal axis of the joint.

6. A family of joint connections for well casing, well tubing, and the like, wherein the joints vary in diameter and are comprised of male and female members in part threaded and in part having smooth metal-to-metal unthreaded sealing surfaces, said sealing surfaces including a conically tapered female surface and opposed longitudinally spaced annular sealing crests along a nose portion of the male surface, said female member having an internally disposed positive stop surface against which the nose of the male member abuts during joint makeup, and the two members having cooperating tapered threaded surfaces that mate with an interference fit, said members having a hand-tight position in which the nose of the male member is spaced from the positive stop surface and requiring power tightening to move the male member from the spaced position to the positive stop surface, the distance from the hand-tight position to the stop increasing with an increase in diameter of the two members to provide graduated allowances for tightening to avoid large variations in hoop stress in the joint connections with respect to diameter, caused by the interference fit upon makeup.

7. A threaded joint especially for oil well casing and tubing, including mating male and female tubular members having cooperating tapered threaded surfaces of an improved buttress thread form, in which the thread of each member has major diameter flat portions parallel to the pitch line of the threaded surfaces and minor diameter flat portions parallel to the central longitudinal axes of the members, in which flat portions comprising only one of the major and minor diameter flat portions of one member contact opposed flat portions of the other member, and in which a clearance exists between the leading male flank and trailing female flank of the threads of the members when the joint is assembled.

8. A threaded joint as set forth in claim 7 wherein the thread of each mating member is increasingly truncated, from a full thread portion in a direction toward inner ends of the tapered threaded surfaces to a vanishing point short of the end of the respective member and defined by a cylindrical extension of the smallest full thread minor diameter.

9. A threaded joint as set forth in claim 7 wherein, at outer ends of the threaded surfaces, the thread crests of both the male and female members are truncated in a direction toward outer ends of the threaded surfaces to vanishing points defined respectively by the outside diameter of the male tubular member and by a slightly larger clearance diameter than the outside diameter of the male tubular member.

10. A threaded joint as set forth in claim 7 wherein at inner ends of the threaded surfaces the male thread root and female thread crest of the tapered threaded surface of each mating member are increasingly truncated in a direction toward inner ends of the tapered threaded surfaces to a vanishing point defined by a cylindrical extension of the smallest full thread minor diameter, and at outer ends of the threaded surfaces the thread crests of both the male and female members are truncated in a direction toward outer ends of the threaded surfaces to vanishing points defined respectively by the outside diameter of the male tubular member and by a slightly larger clearance diameter than the outside diameter of the male tubular member.

11. A threaded joint as set forth in claim 7 in which minor diameter flat portions of each member contact one another and major diameter flat portions have clearance.

12. A threaded joint as set forth in claim 7 wherein the thread form of the male member has a leading flank radius and the thread form of the female member has a trailing flank radius, both of which at the respective minor diameters, are at least as great as at the respective major diameters.

13. A threaded joint as set forth in claims 7, 8, 9, 10, 11 or 12 wherein male root portions and female crest portions of the threads of the members form an interference fit when the joint is assembled.

14. In a threaded joint, especially for oil well casing and tubing, including mating male and female tubular members having cooperating tapered threaded surfaces: a high pressure metal-to-metal seal comprising a tapered socket surface forming an internal portion of the female member inwardly of the threaded joint, and a plurality of annular convex ridge surfaces on the male member located to contact the socket surface when the threaded joint is assembled and having a common tangent parallel to the socket taper, the angle of said socket taper being on the order of two or more times the angle of the thread taper; an internal annular frusto-conical seat on the female member and an annular frusto-conical sealing surface on the inner end of the male member located to engage the seat when the ridge surfaces are in sealing engagement with the tapered socket surface, said seat forming an acute angle with the tapered socket surface; the thread of each member being of a buttress form that has major diameter flats parallel to the taper of the pitch line of the threaded surfaces and minor diameter flats parallel to the longitudinal axis of the members, in which the minor diameter flats of each member contact those of the other, and in which a clearance exists between major diameter flats and leading flanks of the threads of each member when the joint is assembled; and, at inner ends of the threaded surfaces, male thread roots and female thread crests of the tapered threaded surface of each mating member are increasingly truncated in a direction toward inner ends of the tapered threaded surfaces to a varnishing point defined by a cylindrical extension of the smallest full thread minor diameter, and at outer ends of the threaded surfaces the thread crests of both the male and female members are truncated in a direction toward outer ends of the threaded surfaces to vanishing points defined respectively by the outside diameter of the male tubular member and by a slightly larger clearance diameter than the outside diameter of the male tubular member.

15. A threaded joint especially for oil well casing and tubing, including mating male and female tubular members having cooperating tapered threaded surfaces of an improved buttress thread form, in which the thread of the male member has major diameter flat portions parallel to the pitch line of the threaded surface and minor diameter flat portions parallel to the central longitudinal axis of the male member, and the thread of the female member has minor diameter flat portions parallel to the central longitudinal axis of the female member; in which minor diameter flat portions of the male member contact opposed minor diameter flat portions of the female member, and a clearance exists between the leading male flank and trailing female flank and between the male and female major diameter flat portions of the threads of the members, when the joint is assembled.

* * * * *